Patented June 26, 1951

2,558,520

UNITED STATES PATENT OFFICE 2,558,520

PRODUCTION OF ACROLEIN FROM GLYCEROL

Howard E. Hoyt and Thomas H. Manninen, Stamford, Conn., assignors to U. S. Industrial Chemicals, Inc., New York, N. Y., a corporation of Delaware No Drawing. Application January 29, 1948, Serial No. 5,197

7 Claims. (Cl. 260—603)

This invention relates to a method for the preparation of acrolein by the dehydration of glycerol.

It is well known in the art to prepare acrolein by dehydrating glycerol. As the prior art process is generally practiced, a weight of dehydrating agent (generally potassium acid sulfate) equal to the weight of glycerol dehydrated is used. The method thus requires a relatively large amount of dehydrating agent in comparison with the amount of glycerol dehydrated. Furthermore, only a comparatively small amount of the glycerol employed is converted to acrolein, and in addition the method does not lend itself well to continuous operation.

The foregoing being in brief the state of the art, it is therefore an object of the present invention to provide a method for the dehydration of glycerol to acrolein, in which method a greatly increased amount of glycerol may be dehydrated to acrolein, in comparison with the amount of dehydrating agent used.

It is also an object of the present invention to provide a method for the dehydration of glycerol to form acrolein, in which method the glycerol is converted to acrolein in a comparatively high yield.

The foregoing and other objects are accomplished in accordance with the method of the present invention by maintaining at a temperature adapted to effect the dehydration of glycerol to acrolein a mass of inert, hydrocarbon liquid containing as a dehydration catalyst a carrier which has been impregnated with from about 3 to about 25 parts of orthophosphoric acid, metaphosphoric acid, pyrophosphoric acid or phosphorus pentoxide per 100 parts of the carrier, and feeding glycerol to the mass of liquid at a rate which is substantially equal to that at which the decomposition of the glycerol occurs.

The following example illustrates in detail the practice of the method of the present invention, and is to be considered not limitative thereof.

Example 7 ml. of 85% orthophosphoric acid was dissolved in sufficient water to thoroughly moisten 88 gms. of a sample of diatomaceous earth, and the mixture after stirring was dried at 105° C. The dried catalytic mass was then ground in a mortar with a sample of a petroleum oil fraction having a boiling range of about 300–400° C., and made to a final volume of 700 ml. by further additions of the oil.

The oil-catalyst suspension was placed in a suitable container equipped with a heater, a mechanical stirrer, an inlet line, and a fractionating column leading to a condenser. 123 gms. of 95% glycerol (5% water) was led into the flask beneath the surface of the oil-catalyst suspension at a rate of approximately 51 gms. per hour, while the temperature of the oil-catalyst suspension was maintained at approximately 286° C. The temperature at the top of the fractionating column was maintained at a point such that vaporized oil was returned to the container. By this procedure 72.3% of the glycerol was converted to acrolein, which was recovered by distillation of the condensed vapors.

Various modifications may be made in the specific procedure of the example in practicing a method falling within the scope of the present invention. Thus, the catalyst may be prepared using other carriers, in addition to the diatomaceous earth specifically used in the example. Among such suitable alternate carriers are finely divided carbon, activated carbon, coke, asbestos, silica gel, activated alumina which has been treated with a mineral acid (e. g., HCl, $H_2SO_4$, $H_3PO_4$, etc.) and thereafter washed with water to remove free acid and soluble salts, clays which have been similarly treated, etc. The amount of orthophosphoric acid used in impregnating a given amount of carrier has, however, considerable influence upon the activity of the catalyst in the present procedure, and for the best results in making an efficient catalyst the carrier should be impregnated with from about 3 to about 25 parts of orthophosphoric acid per 100 parts of carrier. In addition, a suitable catalyst may be prepared by impregnating one of the aforementioned supports with 3–25% parts of metaphosphoric acid, pyrophosphoric acid or phosphorus pentoxide per 100 parts of carrier. The impregnation of the carrier may be effected, if desired, by grinding a dry mixture of carrier and metaphosphoric, orthophosphoric, pyrophosphoric acid or phosphorus pentoxide, or mixtures thereof, or by grinding a slurry composed of the carrier, acid or anhydride, and hydrocarbon liquid employed in the present process. It is essential in practicing the present method that the acid or anhydride be supported upon a carrier, since if the acid or anhydride is not so supported the yield of acrolein is poor and excessive tar formation results. The precise composition of the catalyst in the inert liquid at the reaction temperature maintained cannot be determined accurately, and for that reason the method for the preparation of the catalyst has been described herein.

Furthermore, a wide variety of inert, hydrocarbon liquids of high boiling point may be substituted for the particular petroleum fraction used in the example, among them being dibenzyl, hexaethylbenzene, triphenylmethane, octadecane, para-diphenylbenzene, diphenyl, para-methyl diphenyl, diphenylmethane, etc. All of the aforementioned liquids have the necessary characteristics for use in the method of the present invention, viz., a high boiling point, stability at the reaction temperature, and non-reactivity with the glycerol or its decomposition products. The relative proportions of catalyst and inert liquid used in the reaction mixture in a given instance will depend upon the catalyst surface exposed by the catalyst and by its activity, and can be varied over a wide range. In this connection, the specific example illustrates relative proportions of catalyst to inert liquid which give a highly advantageous result.

The reaction temperatures employed in the present process do not differ critically from those used in the process of the prior art. It is preferred that reaction temperatures of from about 275 to about 325° C. be employed, although somewhat lower (e. g., 250° C.) and somewhat higher reaction temperatures are operable. In addition, the rate of feed of the glycerol to the reaction mixture may be varied widely. Thus, in the specific example, varying the rate of glycerol fed from 30 to 92 gms. per hour would have had no substantial effect upon the proportion of glycerol converted to acrolein.

In the specific example, the reaction mixture was agitated by means of a mechanical stirrer. Agitation of the reaction mixture is not essential in practicing the method described herein, but it is of help in effecting the reaction. If desired, such agitation as is desired may be obtained by circulation of the reaction mixture by means of a pump, which circulation may be made through a heater to accomplish the two-fold purpose of agitating the reaction mixture and maintaining it at the proper reaction temperature.

The method described herein has a number of advantages over that which is customarily practiced according to the prior art. In addition to making possible the production of acrolein by a process which is continuous, the method described herein also results in an exceedingly high conversion of the glycerol to acrolein. Furthermore, the ratio of the catalyst employed to the glycerol converted is significantly less than that encountered in the prior art process discussed hereinbefore. Moreover, the present method results in a much lowered formation of tars, and the residue remaining in the reaction mixture is fluid and can be readily handled. Also, the catalyst employed in the present method is inexpensive and easily prepared.

We claim:

1. The method for the preparation of acrolein by the dehydration of glycerol which comprises maintaining at a temperature adapted to effect the dehydration of glycerol to acrolein a mass of inert, hydrocarbon liquid containing as a dehydration catalyst a carrier which has been impregnated with from about 3 to about 25 parts per 100 parts of said carrier of a material selected from the group consisting of orthophosphoric acid, metaphosphoric acid, pyrophosphoric acid and phosphorus pentoxide, and feeding glycerol to said mass of liquid at a rate substantially equal to that at which the decomposition of the glycerol occurs.

2. The method of claim 1 in which the inert carrier has been impregnated with orthophosphoric acid.

3. The method of claim 1 in which the inert, hydrocarbon liquid is a petroleum fraction.

4. The method of claim 1 in which the carrier is diatomaceous earth.

5. The method for the preparation of acrolein by the dehydration of glycerol which comprises maintaining at a temperature adapted to effect the dehydration of glycerol to acrolein a liquid petroleum fraction containing as a dehydration catalyst a carrier which has been impregnated with from about 3 to about 25 parts of orthophosphoric acid per 100 parts of said carrier, and feeding glycerol to said liquid petroleum fraction at a rate substantially equal to that at which the decomposition of the glycerol occurs.

6. The method of claim 5 in which the carrier is diatomaceous earth.

7. The method of claim 6 in which the dehydration is effected at a temperature within the range from about 250 to about 325° C.

HOWARD E. HOYT.
THOMAS H. MANNINEN.

REFERENCES CITED

The following references are of record in the file of this patent:

UNITED STATES PATENTS

| Number | Name | Date |
|---|---|---|
| 2,042,224 | Groll et al. | May 26, 1936 |
| 2,421,554 | Finch et al. | June 3, 1947 |